United States Patent
Johansson et al.

(10) Patent No.: US 7,303,208 B2
(45) Date of Patent: Dec. 4, 2007

(54) AIR-BAG

(75) Inventors: Jack Johansson, Landvetter (SE); Annika Warm, Vårgärda (SE)

(73) Assignee: Autoliv Development AB, Vargarda (SE)

( * ) Notice: Subject to any disclaimer, the term of this patent is extended or adjusted under 35 U.S.C. 154(b) by 181 days.

(21) Appl. No.: 10/508,175

(22) PCT Filed: Mar. 4, 2003

(86) PCT No.: PCT/SE03/00345

§ 371 (c)(1),
(2), (4) Date: Aug. 19, 2005

(87) PCT Pub. No.: WO03/078214

PCT Pub. Date: Sep. 25, 2003

(65) Prior Publication Data

US 2006/0012160 A1    Jan. 19, 2006

(30) Foreign Application Priority Data

Mar. 19, 2002    (GB) .................................. 0206455.8

(51) Int. Cl.
*B60R 21/16*    (2006.01)
(52) U.S. Cl. ..................... 280/743.1; 280/731; 280/732
(58) Field of Classification Search ............. 280/730.1, 280/730.2, 731, 732, 743.1, 743.2; 383/55, 383/84, 125
See application file for complete search history.

(56) References Cited

U.S. PATENT DOCUMENTS

| | | | |
|---|---|---|---|
| 5,316,337 A | | 5/1994 | Yamaji et al. |
| 5,529,340 A | * | 6/1996 | Fairbanks ................. 280/743.1 |
| 5,607,182 A | | 3/1997 | Nelsen et al. |
| 5,664,805 A | * | 9/1997 | Yoshida et al. .......... 280/743.1 |
| 5,836,612 A | * | 11/1998 | Lang ....................... 280/743.1 |
| 5,855,393 A | | 1/1999 | Keshavaraj |
| 5,865,467 A | * | 2/1999 | Bito et al. ............... 280/743.1 |
| 5,944,342 A | | 8/1999 | White, Jr. et al. |
| 5,975,571 A | * | 11/1999 | Ford et al. ............... 280/743.1 |
| 6,129,382 A | * | 10/2000 | Tonooka .................. 280/743.1 |
| 6,168,203 B1 | * | 1/2001 | Amamori ................. 280/743.1 |
| 6,180,204 B1 | * | 1/2001 | Keshavaraj .................. 428/81 |
| 6,270,113 B1 | * | 8/2001 | Wipasuramonton et al. ....................... 280/730.2 |
| 6,279,944 B1 | * | 8/2001 | Wipasuramonton et al. ....................... 280/730.2 |

FOREIGN PATENT DOCUMENTS

DE    4430221 C1    11/1995

(Continued)

*Primary Examiner*—Paul N. Dickson
*Assistant Examiner*—Toan C. To
(74) *Attorney, Agent, or Firm*—Brinks Hofer Gilson & Lione

(57) ABSTRACT

An air-bag is formed using two substantially identical, but inverted, fabric elements. Each element defines a generally rectangular region having, at one narrow end thereof, a generally triangular extension, one side of which is co-extensive with one side of the rectangular region. The other side of the rectangular region has a triangular or thumb-like projection. The two elements are substantially superimposed with the rectangular regions thereof aligned. If the ends of the rectangular regions carrying the triangular extensions are separated, the projections or thumbs may be folded to form side-walls, and the triangular projections may be folded inwardly to form an end region. A single peripheral seam may seal the two elements together to form an air-bag.

10 Claims, 3 Drawing Sheets

U.S. PATENT DOCUMENTS

| | | | |
|---|---|---|---|
| 6,299,206 B1 * | 10/2001 | Keshavaraj | 280/743.1 |
| 6,523,855 B2 * | 2/2003 | Musiol et al. | 280/729 |
| 6,672,618 B2 * | 1/2004 | Keshavaraj | 280/743.1 |
| 6,692,023 B2 * | 2/2004 | Tokita et al. | 280/743.1 |
| 6,827,368 B2 * | 12/2004 | Jang et al. | 280/729 |
| 7,048,304 B1 * | 5/2006 | Keshavaraj | 280/743.1 |

FOREIGN PATENT DOCUMENTS

| | | |
|---|---|---|
| DE | 10246769 A1 | 4/2004 |
| EP | 0 553 542 A1 | 8/1993 |
| EP | 0 955 215 A2 | 11/1999 |
| EP | 1 122 134 A1 | 8/2001 |
| JP | 5-77342 | 3/1993 |
| WO | WO 02/16174 A1 | 2/2002 |
| WO | WO 03/106228 A1 | 12/2003 |

* cited by examiner

US 7,303,208 B2

AIR-BAG

CROSS REFERENCE TO RELATED APPLICATION

This application claims priority to GB 0206455.8 filed Mar. 19, 2002 and PCT/SE03/00345 filed Mar. 4, 2003.

BACKGROUND OF THE INVENTION

The present invention relates to an air-bag, and more particularly relates to an air-bag intended to protect an occupant of a motor vehicle in the event that an accident should occur.

Many different designs of air-bag have been proposed for use in protecting passengers in motor vehicles. Some air-bags are formed using two identical sheets or layers of fabric which are simply superimposed and connected by a peripheral seam. The air-bag, before folding and inflation, can therefore be spread out to be perfectly flat. Air-bags of this type are frequently used as a driver's air-bag, the air-bag being mounted within the hub of a steering wheel. Initially the fabric layers are substantially circular and thus, when the air-bag is inflated, the air-bag has a generally spherical form.

In order to protect the occupant of the passenger seat adequately, a bag has to be provided which must move a substantial distance into the passenger compartment, since a conventional passenger bag is initially stored in a housing present in the dashboard of a vehicle, which is further from the passenger than the steering wheel is from the driver. It has therefore been the practice to utilise a pre-shaped, or three-dimensional air-bag for such an application. A typical three-dimensional passenger air-bag is made of at least three pieces of fabric which comprise two side pieces, and at least one middle piece which connects the two side pieces. Typically such an air-bag, when spread out uninflated, will partly stand up. The fabrication of such an air-bag requires much work cutting out the pieces, and also much work in sewing the pieces together. Consequently these air-bags are expensive to manufacture.

U.S. Pat. No. 5,454,594 describes a three-dimensional air-bag which is formed from two pieces of fabric which are interconnected using one continuous seam. The two pieces of fabric are not identical, and the resultant air-bag has a seam pattern which is reminiscent of that of a tennis ball. It is not practicable to cut the pieces of fabric from a single sheet of fabric without substantial wastage.

WO99/46149 discloses an air-bag made from a single element of fabric which comprises two mirror-image portions interconnected by a fold-line. Again it is difficult to cut fabric elements for use in forming air-bags of this type from a single sheet without substantial wastage of fabric.

The present invention seeks to provide an improved air-bag.

According to this invention there is provided an air-bag, the air-bag comprising two fabric elements of corresponding, but inverted design, each fabric element defining a generally rectangular region having, at one end thereof, a generally triangular extension, the extension having one side thereof substantially contiguous with one side of the rectangular region, the element having a projection extending outwardly from the other side of the rectangular region, the two elements being located adjacent each other with the rectangular regions thereof substantially superimposed, and with the projections provided on opposed sides thereof, the elements being interconnected by means of a peripheral seam, the rectangular region of one element forming a rear wall, and the rectangular region of the other element forming a front wall, the projections forming side-walls interconnecting the front wall and the rear wall, and the triangular regions being inter-engaged to form an end region of the air-bag.

Preferably each projection has a linear edge extending from the relevant side of the rectangular area at a point spaced from the end thereof, the linear edge being complemented by a terminal region which terminates substantially at a corner of the rectangular area.

In one embodiment the terminal region is curved.

Preferably the air-bag, when inflated, is substantially "drop"-shaped.

In an alternative embodiment the projection is of generally triangular form.

Conveniently the air-bag, when inflated, is generally triangular-shaped.

Preferably the air-bag is provided with a gas inlet hole formed in one of the fabric layers.

Alternatively a gas inlet hole is formed in the seam.

In order that the invention may be more readily understood, and so that further features thereof may be appreciated, the invention will now be described, by way of example, with reference to the accompanying drawings in which:

DETAILED DESCRIPTION OF THE INVENTION

Figures 1, 2:
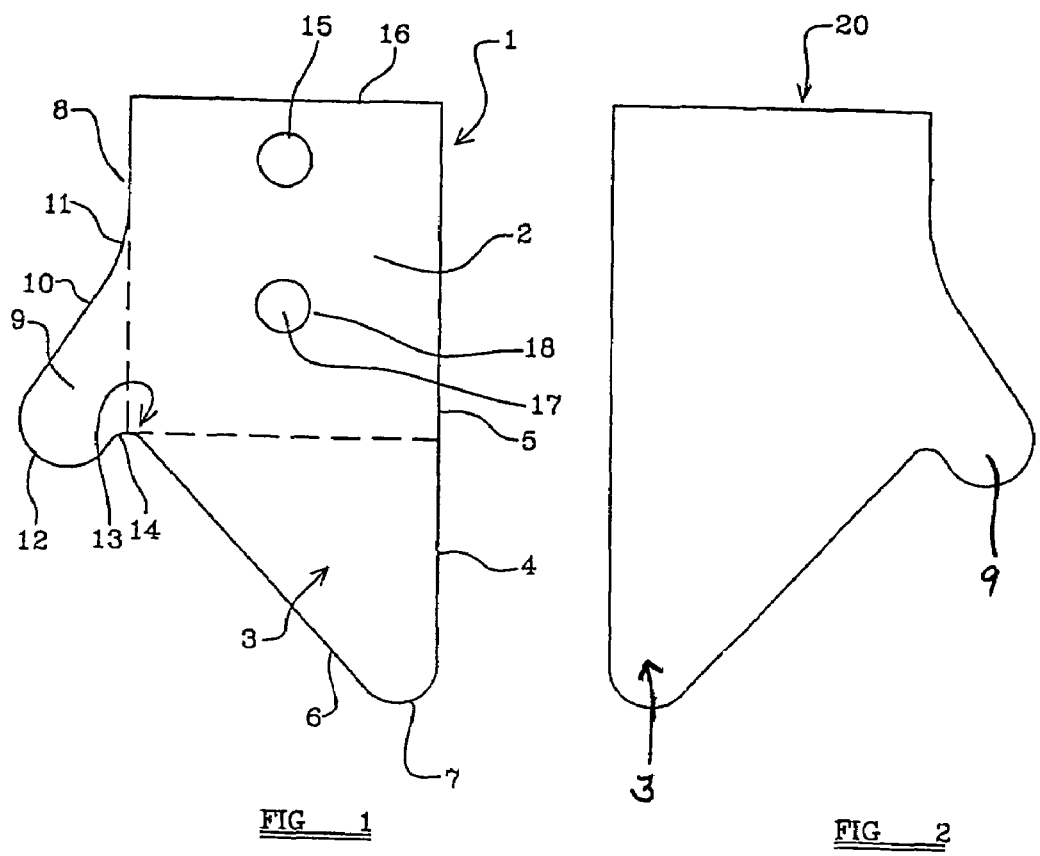
FIG. 1 is a view of a first fabric element.
FIG. 2 is a view of a second fabric element.

Referring initially to FIG. 1 of the accompanying drawings, a fabric element 1 is illustrated. The fabric element 1 has a main rectangular region 2. Extending from one end of the main rectangular region 2 is a generally triangular extension 3. The triangular extension 3 has one side 4 thereof contiguous with one side of the rectangle, and another side 6 thereof which terminates adjacent the end of the other side of the rectangle. The apex 7, between these two sides 4, 6 is rounded. Extending from that other side 8 of the rectangle is an inclined projection or "thumb" 9. The projection 9 has a substantially linear edge 10 which extends away from the rectangle from a point 11 part-way along the relevant side 8 thereof. The linear side 10 terminates with an inwardly curved terminal region 12 which curves inwardly to meet the side 6 of the triangular portion 3 substantially at the corner 13 of the rectangular portion 2. The cusp 14 between the curved region 12 and the side 6 of the triangular portion is recessed in a curved manner that emulates the rounded apex 7 of the triangular extension 3. The fabric element 1 has a shape resembling that of a mitten.

A fabric element 1 is shown provided with an aperture 15 adjacent the end 16 of the rectangular region 2 remote from the extension 3. The aperture 15 is adapted to receive a gas generator or the like. The fabric element 1 also has a vent opening 17 provided in a central area 18 of the rectangular portion 2.

FIG. 2 illustrates a fabric element 20 which is effectively the mirror image of the fabric element 1, but without the apertures therein. The fabric element 20 may indeed be an element that is identical with the fabric element 1, but which has simply been inverted or turned over. The elements are thus of inverted design.

Figure 3:
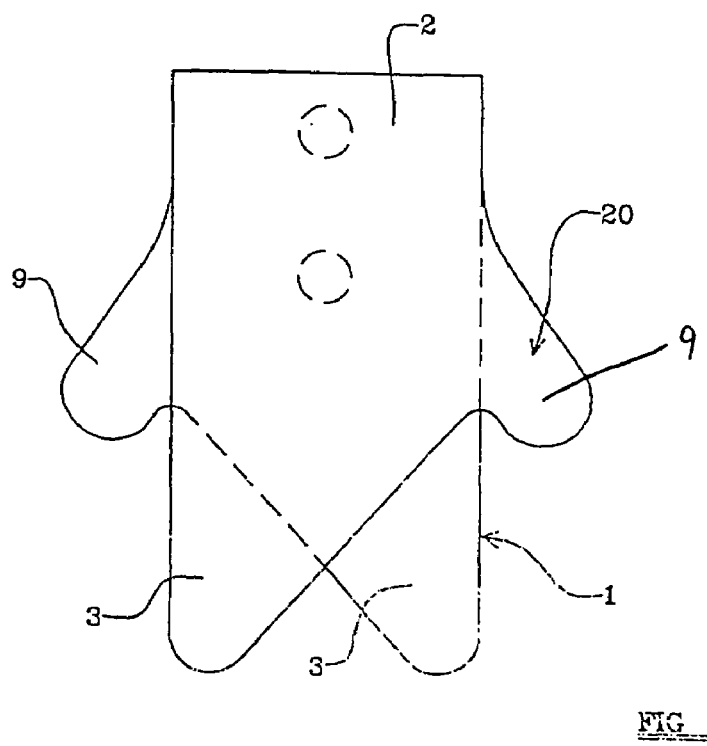
FIG. 3 is a view of the fabric elements when superimposed as an initial stage during the fabrication of an air-bag.

The two fabric elements 1 and 20 may be substantially superimposed, with the rectangular regions of the elements being co-aligned. This is the situation shown in FIG. 3. With the fabric elements in this configuration, the projection or thumb 9 of the fabric element 1, which is the lower fabric element, protrudes from one side, whereas the corresponding projection or thumb 9 of the element 20, which is the upper element, projection the other side.

The upper fabric element 20 is then peeled back slightly from the lower fabric element 1, starting at the end of the fabric element 20, constituted by the triangular protrusion 3. The fabric element 20 thus becomes a front wall which is spaced from a rear wall defined by the fabric element 1. The projection or thumb 9 of the fabric element 20 may then be folded downwardly about a notional fold-line which is coincident with the edge of the rectangle 2, whilst the projection or thumb 9 of the lower fabric element 1 may simultaneously be folded upwardly. The projections or thumbs 9 then effectively form side-walls interconnecting the front wall and the rear wall. The triangular projection 3 of the upper fabric element 20 may then be folded generally downwardly, whilst simultaneously the triangular projection 3 of the lower fabric element 1 is folded upwardly, and the two triangular regions will then engage in a co-operating manner to define an end region 21. A single seam may be provided which interconnects the adjacent edges of the elements 1 and 20 when in the condition described, to produce a "three-dimensional" air-bag.

Figure 4:
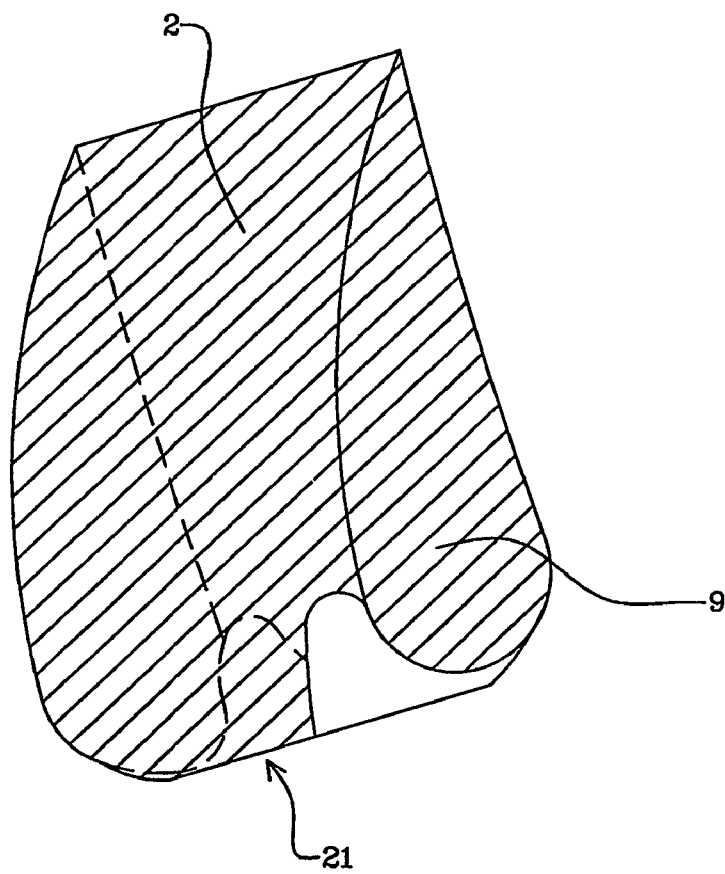
FIG. 4 is a perspective view of an air-bag made from the fabric elements of FIGS. 1 to 3.

FIG. 4 illustrates the air-bag with the upper fabric element 20 being shown shaded, for ease of identification. It can be seen that the air-bag presents a front wall defined by the fabric element 20, and a rear wall defined by the fabric element 1, and two side-walls defined by the projections 9. The interconnected triangular regions 3 form a "drop"-shaped end region 21 for the air-bag. The bag is thus of drop-shaped form.

Figure 5:
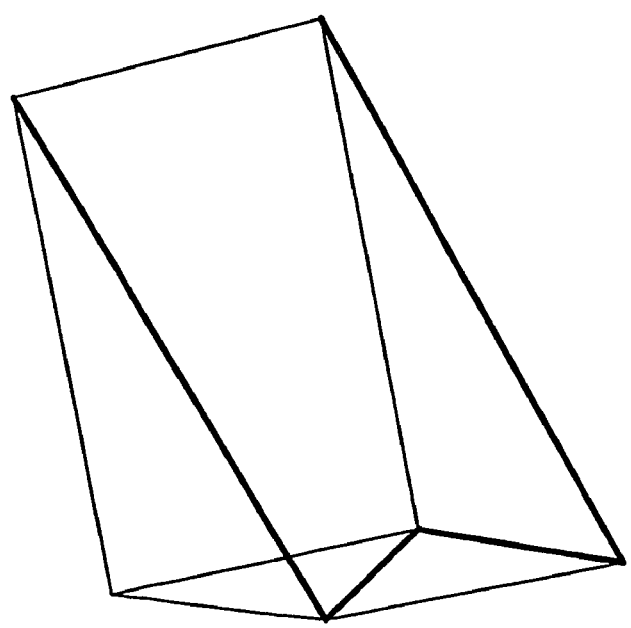
FIG. 5 is a view illustrating a modified embodiment of the invention.

FIG. 5 illustrates a modified embodiment of the invention in which the end region of the air-bag is somewhat flatter than that shown in FIG. 4. The air-bag is thus of triangular form.

In this embodiment the projection or "thumb" is generally triangular, the curved terminal region 12 of the embodiment of FIGS. 1 to 4 being replaced by a straight side.

Figure 6:
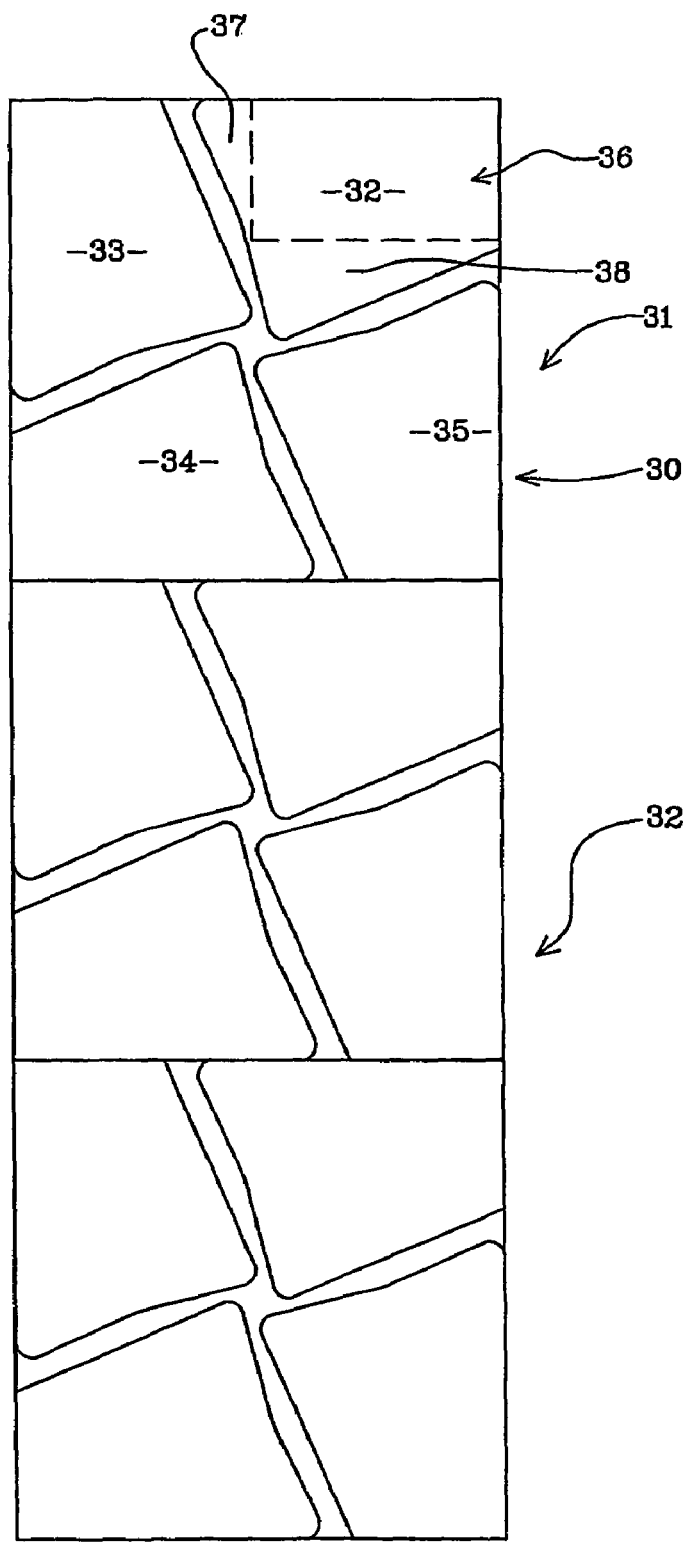
FIG. 6 is a view of a sheet of fabric showing a cutting pattern for cutting elements to be used to form a further embodiment of the invention.

FIG. 6 illustrates a sheet of fabric 30 illustrating the cutting pattern used to produce a plurality of elements of fabric. As can be seen, the cutting pattern is such that the pattern is repeated as repeats 31, 32 etc. The repeats are each identical. The repeat 31 comprises four substantially identical elements 32, 33, 34, 35, each element presenting a rectangular portion 36 with a generally triangular projection 37 at one end thereof, and a further projection or "thumb" 38 provided at one side thereof. In each case a corner of the rectangular region 36 is provided at a corner of the repeat 31. It can be seen that the four elements can be cut from a single sheet of fabric with a minimum of wastage. An air-bag of the type described may be used as a passenger air-bag, or may be used as a roof-mounted air-bag.

Whilst the invention has been described with reference to an embodiment in which an aperture 15 is provided within one fabric component to receive a gas generator and to act as a gas inlet hole, in an alternative arrangement the aperture could be defined by part of the peripheral seam.

In an alternative embodiment the air-bag may be used as a driver air-bag, and in such a situation the aperture to receive the air-bag will be located within the central region 18 of the rectangular part of the one fabric layer.

It is to be understood that by altering the relative sizes of the triangular region 3 and the projection 9 of each fabric layer, air-bags of different final configuration may be produced. The length of the first side 5 of the rectangular element 1 together with the length of the contiguous side 4 of the triangular portion 3 should be the same as the length of the other side 8 of the rectangle, as far as the origin 11 of the linear side 10 of the projection 9, and the length of the periphery of the projection 4 so that, when the two described elements are joined together, the free apex of the triangular portion 3 of one fabric element is neatly received within the cusp formed between the projection 9 and the triangular portion 3 of the other layer of fabric.

Whilst, as is clear from the foregoing description, it is particularly advantageous to fabricate an air-bag from two separate fabric elements, an air-bag in accordance with the invention can be made from a single fabric element having two regions interconnected by a fold-line, the element having a configuration equivalent to that of two elements of the type generally described above located adjacent each other with the bases of the rectangular regions lying adjacent each other to form the fold-line.

The invention claimed is:

1. An air-bag comprising first and second fabric elements of corresponding, but inverted design, each of the fabric elements defining a generally rectangular region having, at one end thereof, a generally triangular extension, the triangular extension having one side thereof substantially contiguous with one side of the rectangular region, the fabric elements having a projection extending outwardly from another side of the rectangular region, the first and second fabric elements being located overlaying each other with the rectangular regions of both of the elements substantially superimposed, and with the projections provided on opposed sides thereof, the fabric elements being interconnected by means of a peripheral seam, the rectangular region of the first fabric element forming a rear wall of the air-bag, and the rectangular region of the second fabric element forming a front wall of the air-bag, the projections forming side walls of the air-bag interconnecting the front wall and the rear wall, and the triangular regions being inter-engaged to form an end region of the air-bag.

2. An air-bag according to claim 1 wherein at least one of the projections having a linear edge extending from a side of the rectangular area at a point spaced from the end thereof, the linear edge being complemented by a terminal region which terminates substantially at a corner of the rectangular region.

3. An air-bag according to claim 2 wherein the terminal region is curved.

4. An air-bag according to claim 3 wherein the air-bag, when inflated, is substantially "drop"-shaped.

5. An air-bag according to claim 1 wherein at least one of the projections is of generally triangular form.

6. An air-bag according to claim 5 wherein a face of the air-bag, when inflated, is generally triangular-shaped.

7. An air-bag according to claim 1 is provided with a gas inlet hole formed in one of the first or second fabric elements.

8. An air-bag according to claim 1 wherein a gas inlet hole is formed in the peripheral seam.

9. An air-bag according to claim 1 wherein the generally triangular extension of at least one of the fabric elements forms a free apex and the projection terminal region joining the generally triangular extension at a curved cusp, and wherein the shapes of the free apex and the cusp are complimentary so that they can be affixed together by the peripheral seam.

10. An air-baa according to claim 1 wherein the air-bag has a three dimensional configuration when the peripheral seam is formed joining the two fabric elements together.

\* \* \* \* \*

UNITED STATES PATENT AND TRADEMARK OFFICE
CERTIFICATE OF CORRECTION

| | | |
|---|---|---|
| PATENT NO. | : 7,303,208 B2 | Page 1 of 1 |
| APPLICATION NO. | : 10/508175 | |
| DATED | : December 4, 2007 | |
| INVENTOR(S) | : Jack Johansson and Annika Warm | |

It is certified that error appears in the above-identified patent and that said Letters Patent is hereby corrected as shown below:

<u>In the Claims</u>

In Claim 10, column 6, line 4, delete "air-baa" and insert --air-bag--.

Signed and Sealed this

Twenty-ninth Day of April, 2008

JON W. DUDAS
*Director of the United States Patent and Trademark Office*